United States Patent
Melamed

(10) Patent No.: US 8,963,367 B2
(45) Date of Patent: Feb. 24, 2015

(54) TECHNIQUE FOR REMOTE POWER FEEDING IN ACCESS NETWORKS

(75) Inventor: Amitay Melamed, Moshav Satariya (IL)

(73) Assignee: ECI Telecom Ltd., Petach-Tikva (IL)

( * ) Notice: Subject to any disclaimer, the term of this patent is extended or adjusted under 35 U.S.C. 154(b) by 437 days.

(21) Appl. No.: 13/338,994

(22) Filed: Dec. 28, 2011

(65) Prior Publication Data

US 2013/0169042 A1 Jul. 4, 2013

(30) Foreign Application Priority Data

Dec. 30, 2010 (IL) .......................................... 210374

(51) Int. Cl.
*H02J 1/00* (2006.01)

(52) U.S. Cl.
USPC ............................................... 307/18; 307/19

(58) Field of Classification Search
USPC ......... 700/286, 295, 300; 307/18, 19; 320/137
See application file for complete search history.

(56) References Cited

U.S. PATENT DOCUMENTS

| | | | |
|---|---|---|---|
| 6,555,991 B1 * | 4/2003 | Zettel et al. ................... | 320/137 |
| 6,665,404 B2 | 12/2003 | Cohen | |
| 7,184,905 B2 * | 2/2007 | Stefan ............................. | 702/63 |
| 7,233,127 B2 * | 6/2007 | Chen et al. .................... | 320/106 |
| 7,359,647 B1 | 4/2008 | Faria et al. | |
| 7,415,623 B2 * | 8/2008 | Rapps et al. ................... | 713/300 |
| 7,580,732 B2 * | 8/2009 | Bailey ............................ | 370/216 |
| 7,629,765 B2 * | 12/2009 | Chen et al. .................... | 320/106 |
| 7,644,295 B1 * | 1/2010 | Dotson et al. ................. | 713/340 |
| 7,933,636 B2 * | 4/2011 | Bennett et al. ................ | 455/574 |
| 8,542,126 B2 * | 9/2013 | McKelvey et al. ......... | 340/636.1 |
| 2006/0203997 A1 * | 9/2006 | Bailey ............................ | 379/413 |
| 2006/0290326 A1 * | 12/2006 | Bhesania et al. .............. | 323/210 |
| 2007/0106913 A1 * | 5/2007 | Lewis et al. ................... | 713/300 |
| 2008/0028239 A1 * | 1/2008 | Rapps et al. .................. | 713/300 |
| 2008/0186878 A1 * | 8/2008 | Zheng ........................... | 370/254 |
| 2009/0133733 A1 * | 5/2009 | Retti .............................. | 136/206 |
| 2010/0060238 A1 * | 3/2010 | Chen et al. .................... | 320/136 |
| 2011/0064212 A1 * | 3/2011 | Cooper et al. ................. | 379/307 |
| 2011/0289526 A1 * | 11/2011 | Poole et al. ..................... | 725/14 |

FOREIGN PATENT DOCUMENTS

WO WO 2009/138711 11/2009

* cited by examiner

*Primary Examiner* — Charles Kasenge
(74) *Attorney, Agent, or Firm* — Novick, Kim & Lee, PLLC; Harold L. Novick; Jae Youn Kim

(57) ABSTRACT

A technique for power feeding of a common element of an access network from subscribers of the access network connected to the common element through subscriber lines being electric wires or optical fibers, the method comprises providing the subscribers with respective local power sources, and powering the common element from the one or more local power sources by selectively and/or dynamically combining power conducted there-from through the subscriber lines, thereby allowing at least partial operation of the common element.

6 Claims, 6 Drawing Sheets

TECHNIQUE FOR REMOTE POWER FEEDING IN ACCESS NETWORKS

CROSS-REFERENCE TO RELATED APPLICATIONS

This application claims priority to Israel Application No. IL 210374 filed Dec. 30, 2010, the disclosure of which is incorporated by reference herein in its entirety.

FIELD OF THE INVENTION

The present invention relates to a technique of remote feeding of common elements/nodes in access networks, for example in case of power outage.

BACKGROUND OF THE INVENTION

In conventional telephone networks (known colloquially as "POTS"—plain old telephone system) the end-to-end connection between a telephone exchange and customer premises is made by a branched network of wires along which an electric current can be transmitted, the current being modulated to provide analogue voice signals, and also digital pulses as used for dialing numbers, activating bells or other alerts ("ringing current") and, more recently, for data transmission such as facsimile transmissions or computer connections to the "Internet". The existence of an end-to-end electrical connection in conventional systems allows simple customer equipment (specifically telephone handsets) to be powered at low voltage from a power supply at the exchange. This was a particular advantage in the early development of telecommunications networks, when mains power supplies were less widespread than they have since become. It remains a useful feature that the telephone equipment is powered independently of the mains power supply to the customer premises, as in the event of failure of that supply, a user can still use the telephone to report the fact to the power supply company. Indeed, the user instructions for cordless telephones (which require a mains supply for the base station) strongly advise users to also maintain a fixed (wired-in) telephone on the premises for use in such eventualities.

The presence of an end-to-end wired network has also allowed intermediate elements (herein referred to as "nodes") in the branched network to use electrical power delivered over the wires from elsewhere in the network. Many of these points are either in public locations (the familiar roadside "cabinets", and the "distribution points" which are typically positioned at the top of wooden poles from where the "final drop" wire is connected to the customer premises). These nodes are unattended and often either in remote locations, where it may be difficult to arrange a mains power supply, or in public locations where the presence of a mains power supply could constitute a hazard to some members of the public, and a temptation to others. Hitherto, such nodes have had relatively modest power requirements, and provision of a low-voltage power supply from the exchange has been sufficient to avoid the need for a mains power supply to be provided to these nodes.

For the avoidance of doubt, the term "node" refers to elements within the network, as distinct from the "network termination point" (also known as the "network interface device" NID) located on a customer's premises which provides the interface between the network operator's equipment and that of the customer.

Modern developments in telephony have made this simple pattern less practical in recent times. In particular, the use of electromagnetic media (e.g. microwave or, more commonly, optical fibre) is already well-established in the trunk network (between exchanges) and is now becoming established in the local distribution network. Such arrangements are sometimes known as "fiber to the curb", only the "final drop" from distribution point to customer' premises remaining as conventional copper wire. The use of such connections allows much greater capacity. It is also cheaper, as copper is relatively more expensive compared with optical fibre (or indeed microwaves). However, electrical power cannot be provided to the network nodes over such media.

WO09138711A (see FIG. 1) describes an electrically powered node (3) of a telecommunications system which has a battery power backup (37) associated with its power control unit (33). Under normal conditions it is maintained fully charged by means of trickle currents from the mains power feeds (14) connected to each of a number of customer equipments (4), by way of the "final drop" (10) to the distribution point. These trickle currents are controlled by the respective power control units (33, 43), to prevent overcharging. Using an electrical copper connection (19) provided in parallel with the fibre connection (9), a battery backup (27) can also be maintained in nodes (2) further towards the exchange. These feeds are made reversible, so that if a power outage removes the power supply (14) from the customer premises (4), a "lifeline" plain telephone service between the exchange (1) and the telephone handset (5) is maintained over the connections (9, 10, 13), using the local battery backup (27, 37) in the remote nodes (2, 3). By limiting the service to simple telephony, the battery power (27, 37, 47) can be sufficient to maintain the service for a reasonable duration. The power management systems (23, 33, 43) can be used to transfer charge from one battery (27, 37) to another over the network according to the usage, or remaining life, of each battery (27, 37, 47).

U.S. Pat. No. 6,665,404 describes an apparatus for remote line powering in a telecommunication network, the apparatus including a plurality of line pair terminations terminating a corresponding plurality of line pairs that are suitable for use in the telecommunication network, the line pairs being operative to convey electric power supplied by a corresponding plurality of power sources, and an electric power aggregator operative to aggregate the electric power supplied via the plurality of line pairs to provide electric power suitable for powering an appliance, and to control that the electric power supplied via each line pair of the plurality of line pairs does not exceed a pre-defined threshold.

The apparatus additionally includes an alarm and logic unit operative to generate an alarm indicating a low voltage output level. The alarm and logic unit may further be operative to generate an indication indicating that electric power is not received over at least one line pair.

U.S. Pat. No. 7,359,647B describes a technique for transmitting and receiving power over optical fiber—in particular, a power over fiber system in which an optical network transmits electrical power via an optical signal and also transmits data within the optical network. The optical signals include a high frequency data portion that comprises the data to be transmitted, and either a constant or low frequency power signal portion. The optical signal is received and converted into an electrical signal by a photodetector/photodiode that is electrically filtered to separate the data signal from the power signal. The data signal is then processed using known techniques. The power signal can be conditioned and/or regulated, if necessary, and provided either directly to a terminal piece of equipment to provide all the required power thereto, or may be combined with locally provided power to contribute at least a portion of the power required by the equipment.

To the best of the Applicant's knowledge, there is no an effective practical solution for reliable operation of an access node or any other common element not provided with a battery, in case of power outage.

OBJECT AND SUMMARY OF THE INVENTION

It is a first object of the present invention to propose a simple and cost effective solution for maintaining functionality of a common element/node in an access network, when such an element is not provided with its own power source or the source is not in order.

More particularly, there is a specific object of providing customers, for example those connected to a common element via DSL lines, with services from an access node in case of power outage (power fail) at the node, at the customer's premises or at the whole communication system.

The Inventor has noted that operators of access communication networks (both of the networks utilizing copper wires, or optical fibers), are usually not interested to bring the mains power to access nodes, and also not interested to add a reserve battery in an intermediate common network element or node (say, in a street cabinet, in an access node, in a distribution point, in an optical amplifiers block, etc.), though the system is required to be in order in any circumstances.

That's why there is an object of the invention to allow smart, judicious operation of access common elements or nodes without a power source (such as mains or battery).

The concept of the invention is actually to provide a smart, selective and/or dynamic distributed power source to a common access network element/node, alternatively or in addition to its power source, and thus to allow supplying communication services to subscribers—just per se or, for example, at the time of power outages.

The object of the invention can be achieved by a method for power feeding of a common element of an access network from a first plurality of subscribers/customers of the access network connected to the common element through subscriber lines such as electric wires or optical fibers, the method comprises:

providing the first plurality of the subscribers with respective local power sources, selecting a second plurality of subscribers from among said first plurality of subscribers and powering the common element from said local power sources of the second plurality of subscribers by selectively and/or dynamically combining power conducted there-from through their respective subscriber lines, thereby allowing at least partial operation of the common element.

The selection of the second plurality of subscribers, as well as the selective and/or dynamic combining of the power may be performed based on a number of predetermined criteria for selection the local power sources.

The step of ensuring of at least partial operation of the common element may also be provided selectively and dynamically. (The partial operation should be understood as providing partial services to the subscribers and/or providing services only to some of the existing subscribers.)

The method may optionally comprise charging, from the common element, one or more of said subscriber lines batteries (those not powering the common unit, but still to be kept alive if so required and agreed in advance) using the combined power.

The option of serving a subscriber line and/or of charging its battery may exist for subscriber lines having high priorities and in cases their batteries are absent or out of order. For example, a customer's premises equipment CPE or an optical network terminal equipment ONT (in optic networks) may be powered in such a manner in case of power outage at the subscriber's premises, to ensure functioning of a number of highly important services: a security alarm, an emergency button, etc.

In one version of the proposed technique the common element is, for example, a bidirectional block of optical amplifiers serving the subscribers of an optical access network via optical fibers, and said subscribers are provided with respective local batteries and lasers for transmitting power to the common element at respective optical wavelengths; the technique also comprising dynamically and/or selectively combining power received from the subscribers at the common element and powering the optical amplifiers using the combined power.

In another version of the technique, the access network is a conventional network (wire-line or optical), the common element is an access node such as a street cabinet (say, comprising a DSLAM or an OLT), the subscribers are connected to the access node via subscriber lines (DSL lines or optical fibers). The access node is preferably provided with a control unit capable of judicially selecting specific ones of said local power sources for combining power being drawn there-from to the common access node, and preferably—by selecting these power sources dynamically.

In practice, the above-mentioned version may be adapted for an access network with two or more said DSL lines, each provided with customer termination equipment at one end, and at the other end connected to the common access node (distribution point, street cabinet, central office CO—having or having not a mains feed); the method comprises:

providing the customer termination equipment of one or more of said DSL lines with respective said one or more local power sources;

in case of absence of power at the common node (say, it does not have a power source, there is power outage of the mains feed, the node's battery is exhausted, etc.), powering the common node from said one or more local power sources, to allow operation of said common node; while dynamically selecting one or more of said local power sources for feeding the common node there-from, and dynamically selecting DSL lines among said two or more DSL lines to be provided with traffic service from the common node in said case, according to a preliminarily determined set of rules.

According to the proposed technique, the common element (access node) may be designed to work from the subscribers' feed permanently or from time to time. In other words, such an element may be provided with a power source (the mains, a battery), but should be secured for cases of power outage or exhaustion or missing of its battery.

The predetermined set of rules may comprise one or more of the following rules, separately or in various combinations:

dynamically selecting the customer's power sources (or batteries) to be currently utilized for feeding the common node depending on available power of said batteries; (for example:

selecting batteries with higher Voltage available for feeding there-from;

if a first customer is unable to feed the common node, the node will look for another power source/another customer and may then decide not to provide service to the first customer;

feeding the common/access node from efficient subscriber lines, i.e. from the customers' batteries/sources providing power with minimum loss in the wires, and thus selecting preferably the customers with the shortest wires till the common node;

selecting specific local sources/batteries to be currently used for feeding the common node so as to prevent draining of each specific local battery/source, and/or avoid draining the battery of the most preferred clients after choosing them (the controller of the common node may be updated about status of the batteries, say by monitoring);

using only a limited number M of the customer's sources at the same time, where M≤N, N is the number of customers (or of subscriber lines) for reducing cost by factor M/N (since usually one does not need all the N Remote Line Powering blocks—RLPs—for N lines, but only M ones);

dynamically changing status of services provided to subscriber lines/DSL lines from the common node (for example, reducing rate or switching off a modem in the common node, corresponding to the subscriber line with low priority, or to the line not providing sufficient power to the common node;

switching transmission rate of a particular DSL lines to its minimum (switching performed by DSLAM, at the corresponding modems), say to ensure at least the voice service during power outage.

providing high priority subscriber lines with full service regardless their powering ability).

dynamically selecting a powering regime of the subscriber lines/DSL lines from the common node (shutting down/reducing power/feeding normally), according to status of the local power sources/batteries and/or status/priority of the subscribers.

It should also be mentioned which operations may be performed in a conventional state of the described access network. In case the common element/node is provided with its own conventional power source (a battery, the mains), and when the system is not under power outage, the method comprises using power from the common node for charging local batteries and/or feeding terminal equipment of the customers—Customer's Premises Equipment (CPE) of DSL lines or ONT units in an optical access network. Local batteries of one or more of the subscriber lines may be charged from the common node during conventional conditions, if their power sources require so. Such prioritized subscriber lines must be preliminarily determined.

According to another aspect of the invention, there is also provided a common node for an access network comprising a first plurality of subscribers provided with local power sources, the common node being capable of selecting a second plurality of subscribers from among the first plurality of subscribers and controllably drawing power via respective subscriber lines of the second plurality of subscribers of the access network (in a selective and/or dynamic manner), for powering itself and maintaining its operation.

According to yet another aspect of the invention, the Inventor also proposes a slightly different method for power feeding of a network element in an optical access network from one or more network subscribers connected to said element via respective subscriber lines being optical fibers, the method comprises providing said one or more network subscribers with respective local power sources, and powering the network element from said one or more local power sources by power drawn there-from upstream in the network through said optical fibers, thereby allowing at least partial operation of the network element. The method may comprise dynamically selecting specific network subscribers from among said network subscribers, for powering the network element. The network element is preferably a common element for more than one subscribers and the method then comprises combining the power drawn from the subscribers up, for powering that common element.

The network element/node, provided in such an access optic network for the defined method, should be capable of (and provided with suitable means for) drawing power via the optical fibers from subscriber(s) of the optical access network, for powering itself and for at least partially maintaining its operation. The element (such as a common element) may preferably be equipped also with means for combining power drawn from a number of the optical access network subscribers, preferably in a selective and/or dynamic manner. The selective manner may be understood, for example, as a capability to select specific subscribers for powering from their local power sources.

According to a further aspect, there is also provided a system comprising any of the above-described common or access nodes, connected via subscriber lines to a number of subscribers provided with local power sources.

Yet further, there is provided a software product comprising computer implementable instructions and/or data for carrying out the method according to any one of the preceding claims, stored on an appropriate non-transitory computer readable storage medium so that the software is capable of enabling operations of the described method when used in a computer system, such as a central control unit of the access node.

The invention will be further described in details as the description proceeds.

BRIEF DESCRIPTION OF THE DRAWINGS

The invention will be further described and illustrated with the aid of the following non-limiting drawings in which.

DETAILED DESCRIPTION OF THE INVENTION

Figure 1:
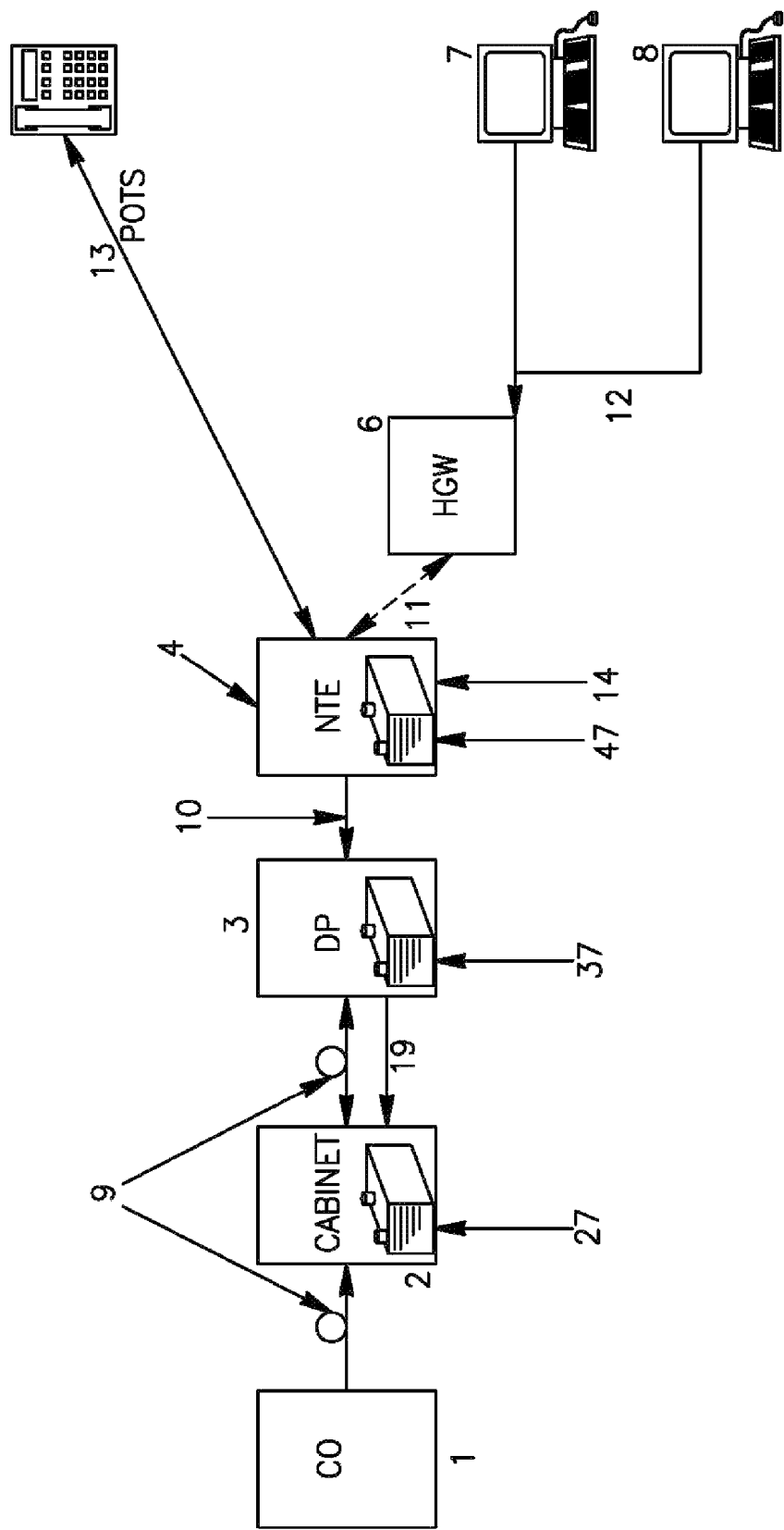
FIG. 1 illustrates a prior art arrangement for feeding lines in an access network

FIG. 1 (prior art) illustrates an arrangement presented in WO 2009138711 mentioned in the Background of the present description. Most modern customer premises telecommunications equipment, such as computers, require much more power than can be supplied over the low-voltage telecommunications network 9, 10 and therefore have their own mains supply. It has been proposed for electrical power to be fed into the telecommunications network by way of the customer premises termination 4 from a power feed 14, and through the "final drop" 10, (which remains wired) to the distribution point 3, as shown in FIG. 1. (To encourage the use of suitable customer premises equipment, the use of such equipment might be expected to attract a discount from the telecommunications provider). As each distribution point feeds a number of customer premises, the power required of each customer would be relatively small.

A problem with such an arrangement is that the network provider is reliant on the customers' own electrical power supplies to power the service.

In the absence of a power supply from the exchange 1, even the standard "POTS" services have to be powered by the customer supply 14. In the event of failure of that supply, the customer would be deprived-of telephone service. This is considered unacceptable, as it would prevent vulnerable users making calls in an emergency—in particular, calls to report the power failure itself.

WO 2009138711 proposes that a node in a telecommunications network comprises a power management system arranged to allow the node to receive electrical power from one or more customer network terminations connected thereto by electrical communications media, and also to deliver electrical power to one or more customer network terminations. This allows a service to be maintained to any such terminations not currently receiving power. To conserve power and to avoid the potential for abuse of this arrangement, only limited service may be made available when the customer is drawing, rather than supplying, power. This can be achieved by providing the node with a communications connection control system for delivering a first category of telecommunications service when power is being supplied to the node from one or more network terminations, and delivering a second, more limited category of communications service when power is not being supplied to the node, or to any network terminations that are not currently supplying power to the node.

However, a general power failure in the district could result in none of the customers being able to supply power to the network. To overcome this problem, a battery backup is preferably provided in the network node, and is kept charged by a trickle charge from each participating user termination. This will allow a basic telephone service to be provided even during a widespread power outage. The parameters of this basic service may be set by the power management system of the node according to the remaining capacity of the battery, for example telephony-only, calls to/from specified numbers only, calls to the emergency services only.

WO 2009138711 suggests that the batteries of one or more network nodes be supplied with power backup from one or more others which are connected to the mains, either directly or through further network connections, provided that there is a wired ("copper") connection between them.

Figure 2:
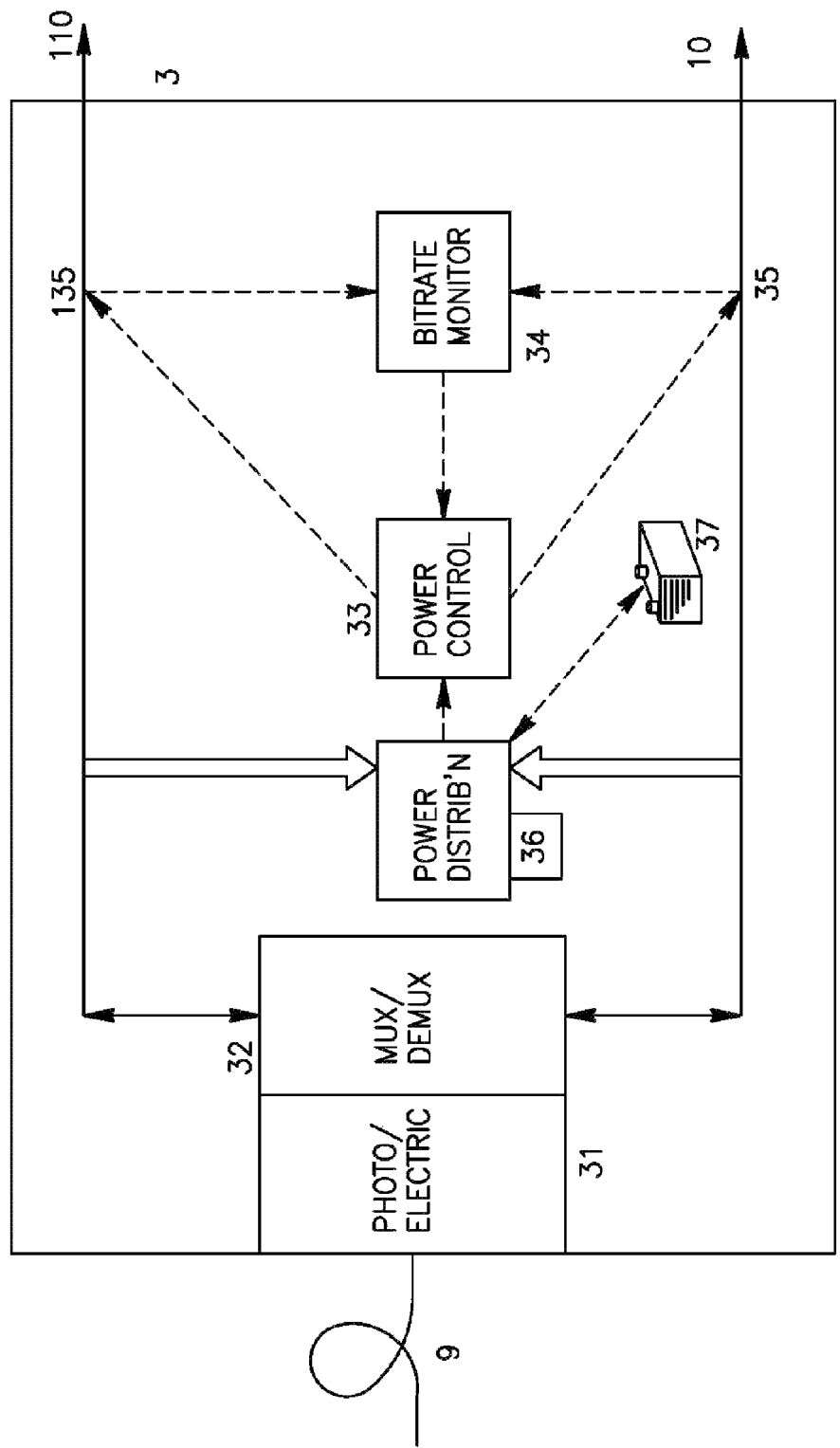
FIG. 2 illustrates a further prior art arrangement for feeding lines in an access network.

FIG. 2 (prior art) shows the arrangement which WO 2009138711 suggests for the distribution point 3 (as well as for customer equipment 4), i.e. that each of them have a respective battery power backup 37, 47 associated with their respective power distribution units 36, 46.

Under normal conditions these are maintained fully charged by means of trickle currents from the mains power feed 14 to the customer equipment 4, and thus over the "final drop" 10 to the distribution point 3, under the control of the power control units 33, 43. The battery backup 37 allows the distribution point to remain usable when none of the co-operating users 4 having a power feed 14 are on line, or in the event of a power failure affecting all the co-operating users. This ensures that the distribution point 3 remains capable of establishing new connections, and that plain telephony service 5 is not lost in those circumstances. The battery backup may be fed either from the current drawn from the users currently on line, or as a trickle current from all users having a mains feed. The customer termination equipment 4 is also provided with a battery backup 47, to ensure that it remains usable in the event of a failure of the power feed 14.

In such a network, traditional voice telephony services can be provided via subscriber line interface circuits (SLIC)s in the fibre-fed remote node 3. Alternatively, VoIP (Voice over Internet Protocol) facilities can be used using the digital subscriber loop (DSL) link to the home gateway 6. Under power-outage conditions the DSL can revert to a low-power mode that has sufficient capacity to transport a 64 kbit/s POTS channel. However the arrangement relies upon both the customer termination 4 and Home Gateway 6 having an operational battery back-up system. Therefore it is preferred to use SLICs as the supply method for lifeline services.

Figure 3:
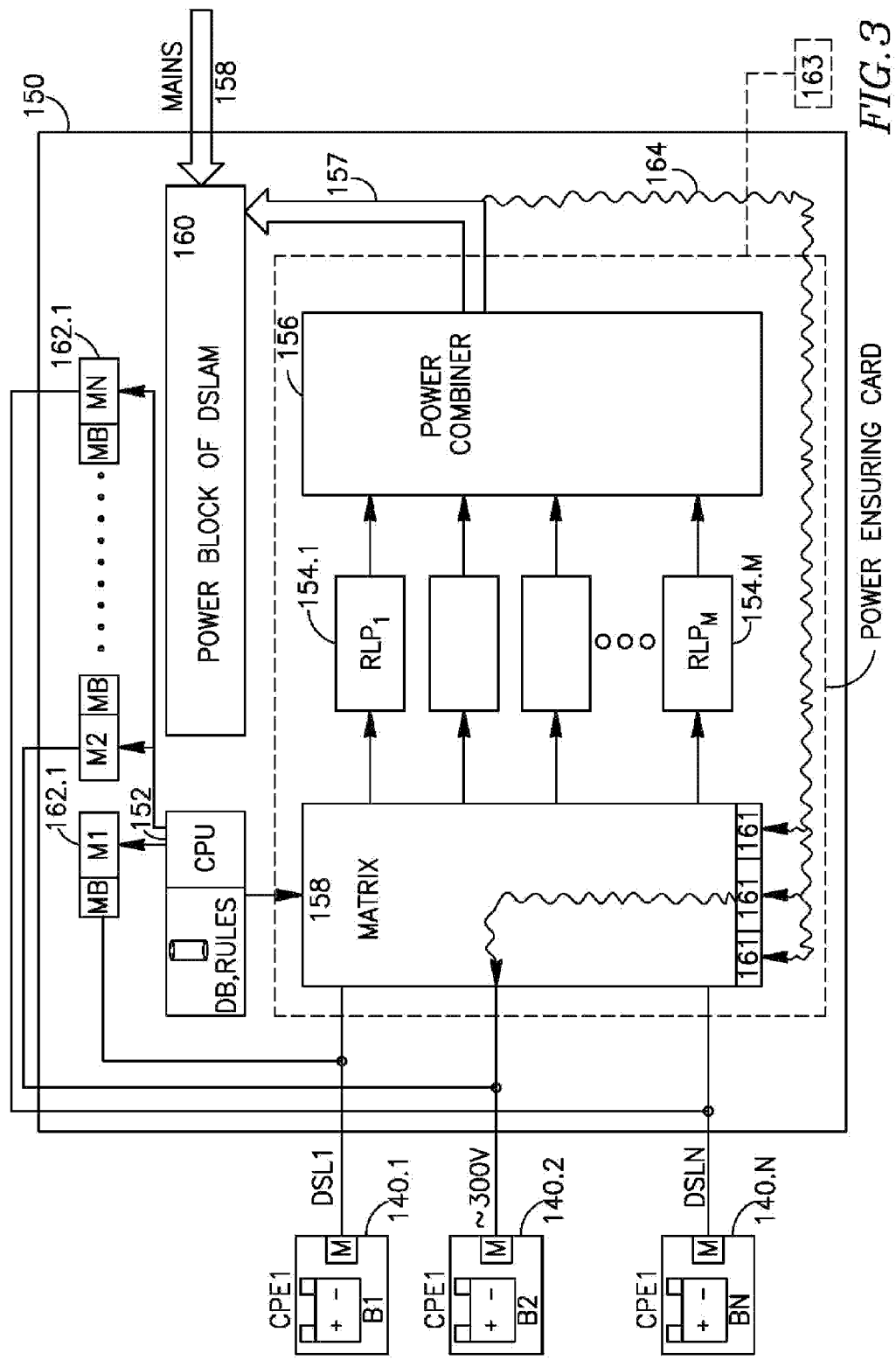
FIG. 3 illustrates one embodiment of the proposed arrangement for feeding DSL lines from an intermediate network node/point (access point).

FIG. 3 schematically illustrates an example of the proposed solution for managing the power feed and service of a number of DSL lines (with their customer equipment) from a common node, in the regime of power outage. In this example the common node is a Digital Signal Line Access Multiplexer (DSLAM) actually being a street cabinet 150, the subscriber lines carry digital traffic (DSL lines). Actually, the subscriber lines may be copper lines, optical fiber lines, or combination of the two. Let in this example the lines are copper pairs.

The Inventor proposes that the street cabinet 150, in its normal regime, is fed from the mains source 158 and, based on that power, a power block of the DSLAM supplies high voltage to DSL lines ($DSL_1$ to $DS_{-N}$) via modems $M_1$-$M_N$ located in the DSLAM, say for charging batteries of the DSL lines. We suppose that the street cabinet 150 does not comprise a battery (say, a service provider is not interested in maintenance of such batteries in street cabinets, and instead prefers the technique which will be described below).

Each of the DSL lines produced by DSLAM terminates with its corresponding customer premises equipment CPE (140.1 ... 140.N), which, according to an agreement between the customer (subscriber) and the provider, should be provided with a local battery/another source (B1 ... BN) for powering the CPEs of the customer. The agreement should also comprise one or more parameters of minimal traffic which must be ensured by the access node 150 to each specific customer (connected to a specific DSL line) during normal operation, and in case of power outage. The parameters may be different for different customers, and for example may depend on a customer's priority, condition of the customer's power source and the customer's conventional traffic, services which the customer receives. The information known in advance may be stored in the database DB of a CPU unit 152 of the DSLAM (street cabinet) 150. Dynamic parameters are provided to the CPU unit by DSLAM, for example, based on monitoring the DSL lines. Also, the DB of the CPU 152 stores a set of Rules necessary for dynamically calculating, based on the mentioned parameters; which "M" DSL lines would participate in feeding the DSLAM in the power outage regime and which traffic would be provided (if at all) in that case via each of the DSL lines.

It may happen, that notwithstanding the mentioned agreement, some DSL lines are not provided with the required local battery, or that the local battery is not charged at the time of power outage.

In case of failure in the mains power supply, the cabinet 150 starts obtaining power feed from its customers/subscribers via one or more respective subscriber lines. The CPU 152, using information obtained from monitoring blocks (shown as blocks MB coupled with the modems $M_1$-$M_N$) of the DSLAM, analyzes the following input information:

how much power (in comparison with a predetermined threshold) is fed via each specific line;

which lines are the shortest (and therefore more economic for powering the common node from the subscribers);

what are relative priorities of the N DSL lines;

which voice/data traffic is carried along each specific line in the normal regime, and which minimal voice/data traffic should be maintained along each line in the power outage regime;

the current status of any specific local battery;

based on the information obtained about lines $DSL_1$-$DSL_N$, on the information preliminarily stored in the block 152, on the information about modems and subscriber lines and their batteries/power sources obtained from the DSLAM monitoring blocks MBs, and by using the Rules, the CPU selects M DSL lines (M≤N) for feeding back the street cabinet and, further, selects regimes for providing digital traffic service along each specific DSL line according to the corresponding preliminary agreement for the regime of power outage.

Some batteries (N-M) may be preserved from exhaustion by decisions of the DSLAM 150, or just not included in the pool if they do not fulfill one or more criteria. Power received via the DSL lines is selectively switched by a matrix unit 158 under control of CPU 152. Then, in our example, the input powers drawn from the DSL lines (and being at quite high voltage of about 300V and low currents, for effective passage via the DSL lines with low power losses) are respectively converted by "M" RLP blocks (remote line powering blocks 154.1-154.M) to the voltage of 48V. The "M" components are then combined at a power combiner 156 and this combined power at the voltage 48V is fed to the power block 160 of the DSLAM, for powering the DSLAM's operation.

In a limited number of exceptional cases the combined power, obtained from the block 156, may be used for feeding back specific prioritized subscriber(s)—see a waved arrow 164 from block 156 to one or more power converters 161, for converting low voltage of received power (of about 48V) to high voltage (of about 300V). The high voltage can be fed via the matrix 158 to one or more of the DSL lines.

Alternatively, for emergency powering of a local subscribers which suffers, say, from power outage or from exhaustion of the local battery, the operation may be performed using an optional emergency battery 163.

Depending on the power provided by each of the DSL lines to DSLAM, and on other information and Rules stored in the Database of the CPU unit 152, CPU calculates which traffic (types of traffic, bit rate, etc.) can be ensured for each specific DSL line, and such decisions are forwarded to specific modems 162.1-162.N of DSLAM.

Figure 4:
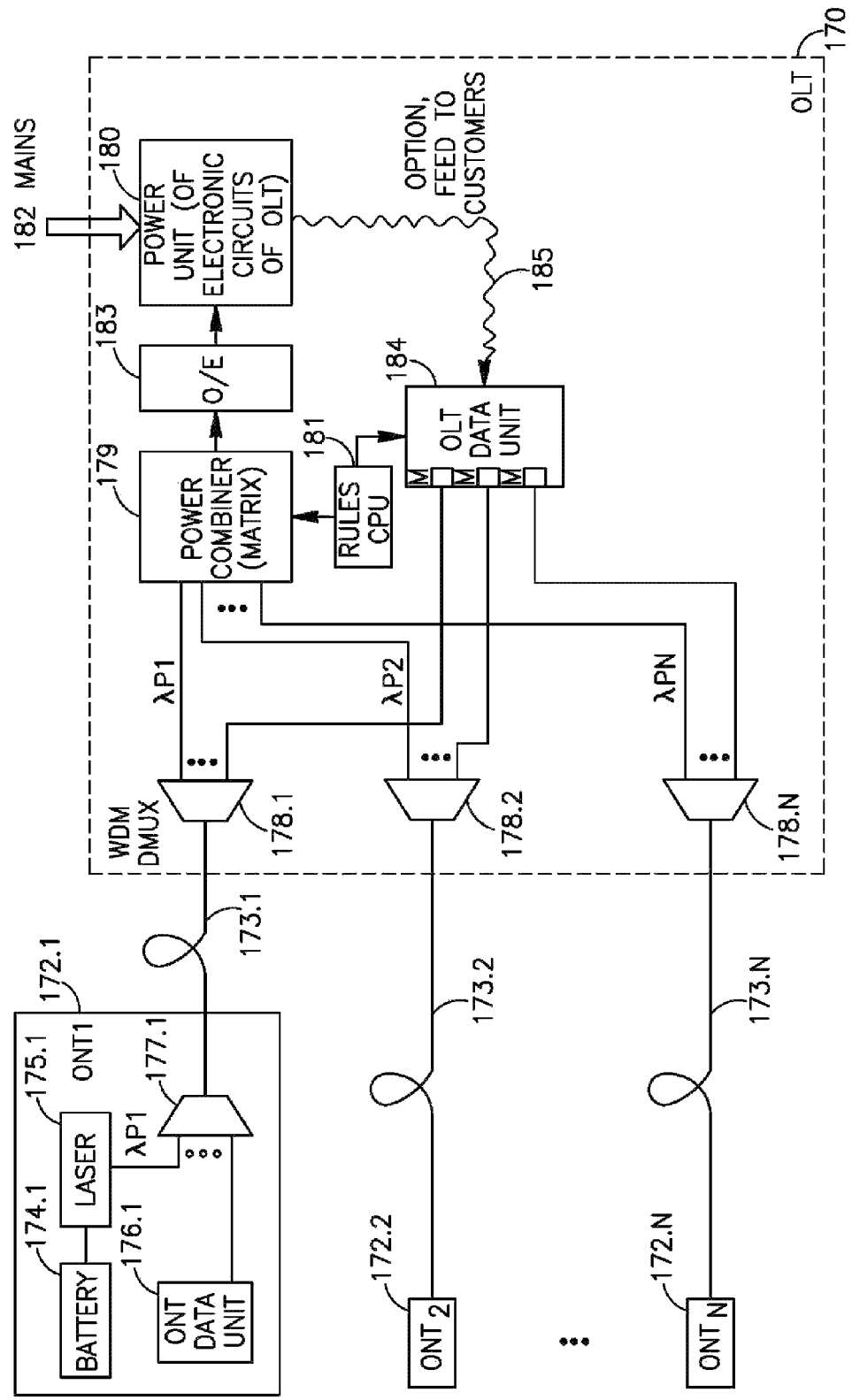
FIG. 4 is an embodiment where the common node is OLT in an optical access network.

FIG. 4 illustrates another exemplary embodiment of the invention for an optical access network (in this case, point to point Ethernet), where the common access node is OLT (Optical Line Termination unit) 170, the subscribers are "N" ONTs (Optical Network Terminations 172.1-172.N) and the subscriber lines 173.1-173.N are optical fibers.

A power block 180 of OLT 170 serves the OLT electronic circuits; in this example, block 180 is connected to the mains line 182.

In case of failure in the mains line 182, or just as a default (if so designed), the OLT 170 starts drawing power from one or more ("M") of its "N" subscribers 172.1-172.N.

Each of the ONTs (see ONT 172.1 shown in more detail) comprises a fiber modem (ONT data unit 176.1) providing a number of optical data channels, and a power battery 174.1. The battery is connected to a laser 175.1 for producing an optical channel (having wavelength λp1) carrying power via that optical channel. The data channels and the power channel λp1 are multiplexed as WDM channels by a MUX 177.1 and forwarded through the optical fiber 173.1 to the OLT 170. In the OLT, the optical channels transmitted from ONT 172.1 are de-multiplexed by a WDM DMUX 178.1 and the power channel λp1 is fed to a Power Combiner 179 which may also comprise an optical matrix.

It should be mentioned that power channels from all other ONTs are similarly brought to the power combiner 179.

The power combiner is controlled by a CPU 181 which stores Rules of selecting local batteries (i.e., selecting power channels of specific ONTs) for feeding OLT, and rules of selecting data services to be supported by the OLT in the described regime. For example, this regime may start at the moment of power outage at the OLT. To provide service which should be supported, the CPU 181 also controls an OLT data unit 184, more specifically—its fiber modems "M" which are respectively interconnected with fiber modems of ONTs via the subscriber fiber lines.

The power drawn from the subscribers (ONTs) is selectively combined by block 179, converted into electrical form by block 183 and fed into the power unit 180 of the OLT. The power unit 180 is thus able to feed electronic circuits of the OLT 170 during the power outage and, optionally, may also provide power feed and/or battery charging to prioritized subscriber(s) via corresponding modems (see a waved arrow 185 from block 180 to block 184).

Figure 5:
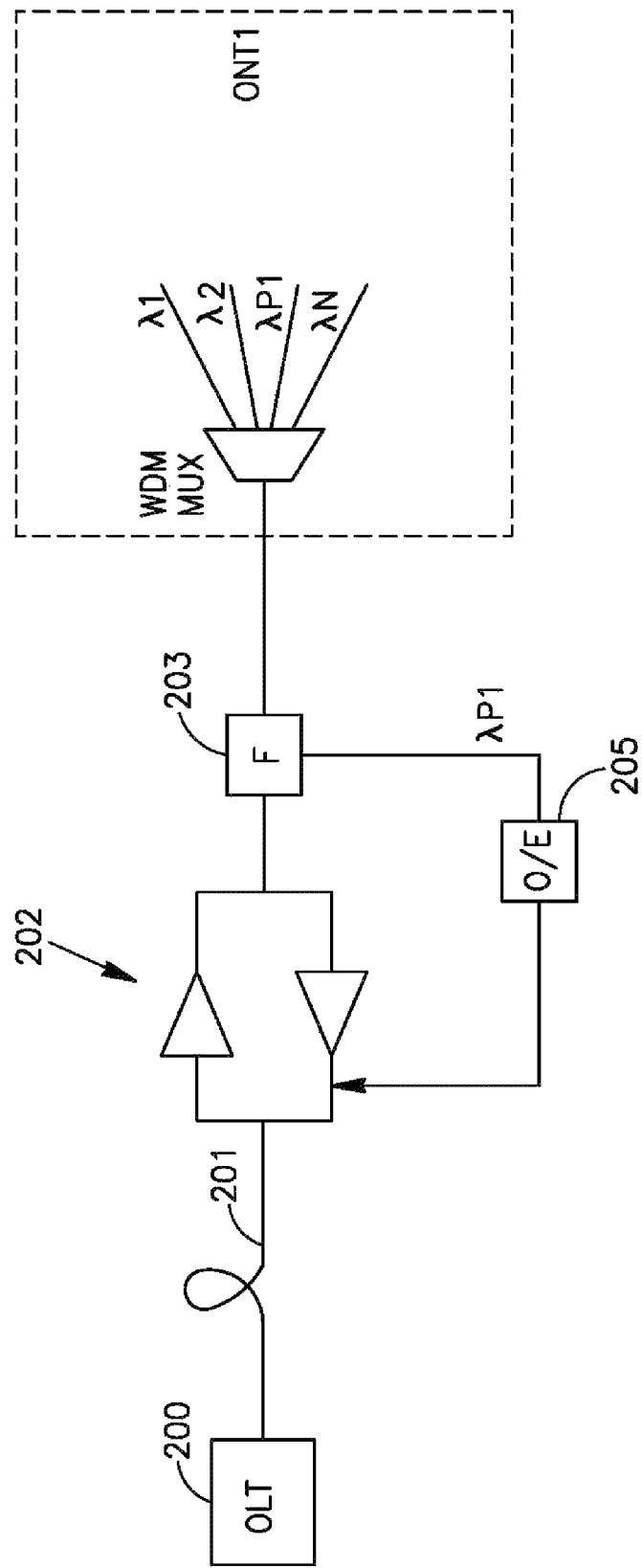
FIG. 5 shows how a common element in an optic access network can be fed from a remote subscriber(s).

FIG. 5 illustrates an example of feeding a common element of an optical access network (point-to-point) from the side of optical subscribers (ONTs). The proposed "back feeding" of a common element (an OLT 200 or any intermediate network element NE) from subscribers via optical fibers may be performed also in a point to multipoint network, see for example FIG. 6.

OLT 200, by an optical fiber 201, is connected to an optical subscriber ONT1 via an intermediate network element 202 comprising two optical amplifiers which serve for amplifying data transmitted in two opposite directions. The amplifiers require powering, but they are located in such a place that providing maintenance to any local power source would be a problem. According to the invention, the power to the element 202 may be provided from ONT1, using an optical channel λp1. The optical signal, comprising multiplexed optical channels from ONT1, is split by a by-pass optical filter 203 which extracts the optical power channel λp1 from the passing optical signal. Finally, an optic/electric converter 205 feeds the electric power signal to the amplifiers of the block 202.

Figure 6:
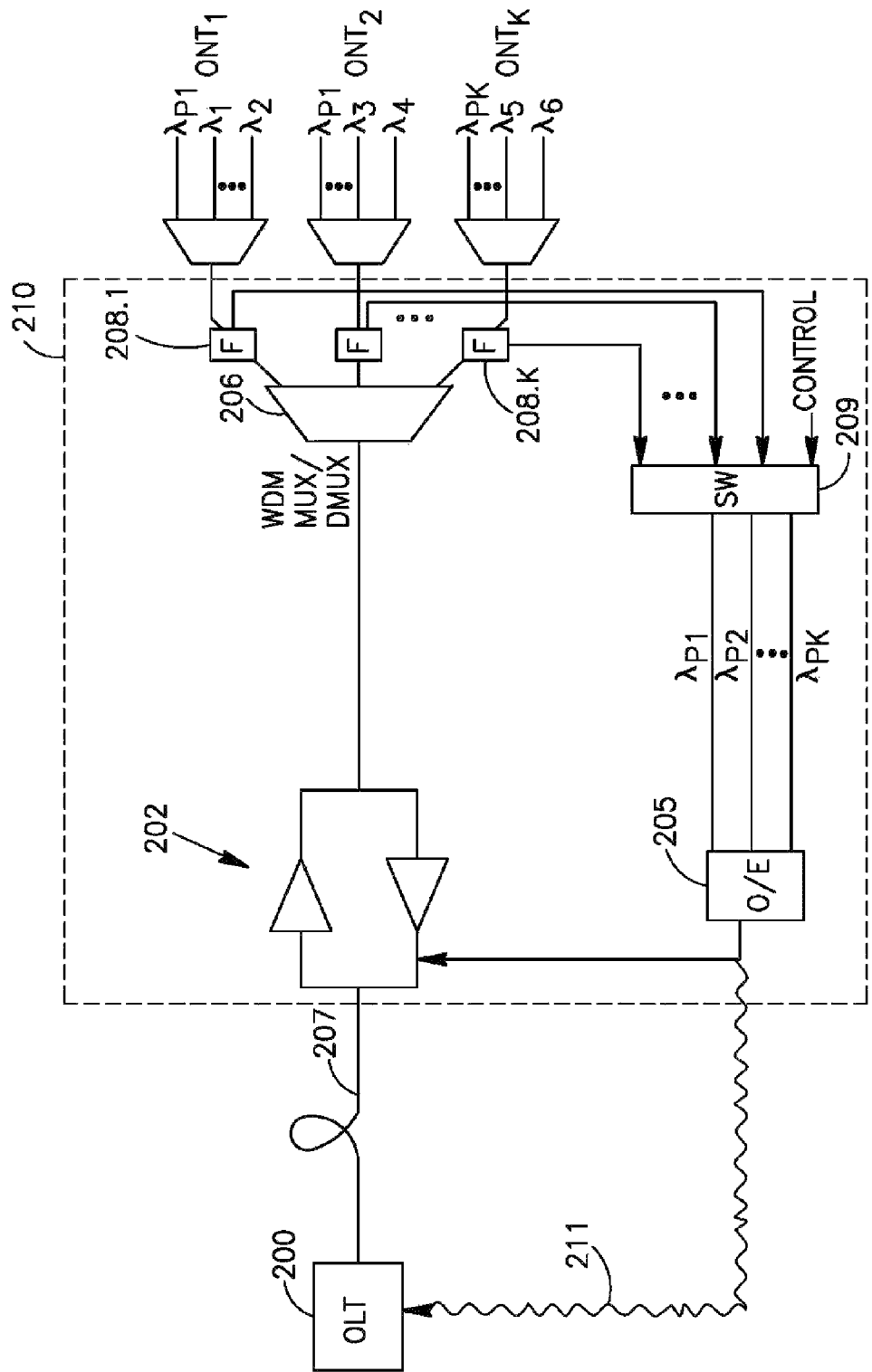
FIG. 6 illustrates an embodiment where the common network element is an amplifier block switched in a fiber line connected to a number of ONTs in an optical access network.

FIG. 6 illustrates another example, where the network, for example, is a passive optical network (PON). OLT 200 is connected to a number of ONTs (ONT1-ONT-K) via a common optical fiber 207 which, via a WDM MUX/DMUX 206, is connected to a number of individual fibers (subscriber lines) each associated with a specific ONT. The common fiber 207 is provided with a common amplifiers block 202 located remote from subscribers and from the OLT. This location may, for example, be a junction 210 (comprising an optical splitter/combiner) of a passive optical network PON.

To feed the intermediate network element 202 remotely, the Inventor proposes drawing power from a number of ONTs. Each ONT outputs WDM multiplexed optical channels to its individual fiber; and one or more of such channels (only λp1 is shown for ONT1) may carry optical power. Output signals from all ONTs, arriving via respective optical fibers, are respectively filtered by filters 208.1-208.K to separate there-from power channels. Communication (data) channels are combined by a MUX or splitter 206, to be forwarded to the amplifiers' block 202. The "k" optical power channels λp1-λpk (or more if some of ONTs bring more than one power channel), filtered by filters 208, may be switched (optionally—controllably switched) by an optical switch 209 to select "p" out of "k" optical power channels fed to the switch. The number of selected channels "p" may be less than or equal to "k". Power of the selected optical channels is then combined and converted into electrical form by an O/E converter 205. The electric power outputted from the converter 205 in this drawings is used for feeding the amplifiers of block 202. However, the electric power from the converter 205 may be used, for example for powering another network element, for example for remote back feeding of OLT 200 (see a waved line 211).

It should be appreciated that though the proposed invention has been described with reference to specific embodiments and drawings, other embodiments and versions of the technique could be proposed; such various embodiments and versions should be considered part of the invention as far as they are defined by the claims which follow.

The invention claimed is:

1. A method for power feeding a common element being a bidirectional block of optical amplifiers serving a first plurality of subscriber devices of an optical access network via optical fibers, the method comprises:
   providing the first plurality of the subscriber devices with respective local batteries and lasers for transmitting power to the common element at respective optical wavelengths;
   selecting a second plurality of subscriber devices from among said first plurality of subscriber devices;
   powering the common element from said local batteries of the second plurality of subscriber devices by combining power received from the second plurality of subscriber devices at the common element; and
   powering the optical amplifiers using the combined power.

2. The method according to claim 1, wherein the selection of the second plurality of subscriber devices is performed based on a predetermined set of rules of selection.

3. The method according to claim 2, wherein the predetermined set of rules comprises one or more of the following rules:
   dynamically selecting the customer termination equipment of one or more of said DSL lines based on an available power at their respective local power sources; and
   dynamically selecting the customer termination equipment of one or more of said DSL lines based on status of their respective local power sources.

4. The method according to claim 1, further comprising powering one or more specific subscriber devices from the first plurality of subscriber devices using the combined power.

5. A method for power feeding a common element being an access node of an access network that comprises two or more subscriber lines being Digital Subscriber Lines (DSL), each provided with customer termination equipment at one end, and at the other end connected to the common access node, the method comprises:
   providing the access node with a control unit capable of dynamically selecting the customer termination equipment of one or more of said DSL lines having respective one or more local power sources capable of feeding the access node there-from;
   in case of absence of power at the access node, powering it from at least one of said one or more local power sources, to allow operation of said access node; and
   dynamically selecting DSL lines among said two or more DSL lines to be provided with traffic service from the access node in said case according to a predetermined set of rules, wherein the predetermined set of rules comprises one or more of the following rules:
   dynamically selecting the customer termination equipment of one or more of said DSL lines, based on an available power at respective local power sources of said one or more DSL lines; and
   dynamically selecting the customer termination equipment of one or more of said DSL lines based on status of the respective local power sources of said one or more DSL lines.

6. The method according to claim 5, further comprising utilizing combined power from the common element for charging one or more of said local power sources.

\* \* \* \* \*